United States Patent
Lee et al.

(10) Patent No.: US 11,178,677 B2
(45) Date of Patent: Nov. 16, 2021

(54) METHOD AND APPARATUS FOR CONFIGURING MULTIPLE COMMON CONTROL CHANNELS IN WIRELESS COMMUNICATION SYSTEM

(71) Applicant: LG Electronics Inc., Seoul (KR)

(72) Inventors: Youngdae Lee, Seoul (KR); Seungjune Yi, Seoul (KR); Sangwon Kim, Seoul (KR); Sunyoung Lee, Seoul (KR)

(73) Assignee: LG Electronics Inc., Seoul (KR)

(*) Notice: Subject to any disclaimer, the term of this patent is extended or adjusted under 35 U.S.C. 154(b) by 16 days.

(21) Appl. No.: 16/616,868

(22) PCT Filed: Jun. 26, 2018

(86) PCT No.: PCT/KR2018/007206
§ 371 (c)(1),
(2) Date: Nov. 25, 2019

(87) PCT Pub. No.: WO2019/004690
PCT Pub. Date: Jan. 3, 2019

(65) Prior Publication Data
US 2020/0137776 A1    Apr. 30, 2020

Related U.S. Application Data

(60) Provisional application No. 62/525,210, filed on Jun. 27, 2017, provisional application No. 62/525,216, filed on Jun. 27, 2017.

(51) Int. Cl.
*H04W 28/02*    (2009.01)
*H04W 76/27*    (2018.01)
(Continued)

(52) U.S. Cl.
CPC ....... *H04W 72/1242* (2013.01); *H04L 5/0044* (2013.01); *H04W 28/0278* (2013.01);
(Continued)

(58) Field of Classification Search
CPC ......... H04W 72/1242; H04W 72/0406; H04W 72/10; H04W 72/04; H04W 76/27;
(Continued)

(56) References Cited

U.S. PATENT DOCUMENTS 8,488,540 B2    7/2013 Yi et al.
2009/0323842 A1* 12/2009 Zhang .................... H04L 27/10
375/260

(Continued)

FOREIGN PATENT DOCUMENTS

EP          02670205      12/2013
WO      WO2012050503      4/2012

*Primary Examiner* — Candal Elpenord
(74) *Attorney, Agent, or Firm* — Fish & Richardson P.C.

(57) ABSTRACT

A method and apparatus for configuring multiple common control channels (CCCHs) in a wireless communication system, specifically in a new radio access technology (NR) system, is provided. A user equipment (UE) configures a first CCCH and a second CCCH. The first CCCH has higher priority than the second CCCH in a logical channel prioritization (LCP) procedure. Upon detecting that data is available for the first CCCH and the second CCCH, the UE constructs a media access control (MAC) protocol data unit (PDU) including the data, based on a priority of the first CCCH and a priority of the second CCCH, and transmits the MAC PDU to a network.

13 Claims, 14 Drawing Sheets

(51) Int. Cl.
  *H04W 28/06* (2009.01)
  *H04L 5/00* (2006.01)
  *H04W 72/10* (2009.01)
  *H04W 72/04* (2009.01)
  *H04W 72/12* (2009.01)
  *H04W 74/08* (2009.01)

(52) U.S. Cl.
  CPC ..... *H04W 28/065* (2013.01); *H04W 72/0406* (2013.01); *H04W 72/10* (2013.01); *H04W 74/0833* (2013.01); *H04W 76/27* (2018.02)

(58) Field of Classification Search
  CPC ......... H04W 74/0833; H04W 28/0278; H04W 28/065; H04L 5/0044
  See application file for complete search history.

(56) References Cited

U.S. PATENT DOCUMENTS

| | | | |
|---|---|---|---|
| 2010/0281486 A1* | 11/2010 | Lu | H04W 72/1247 |
| | | | 718/104 |
| 2015/0071212 A1 | 3/2015 | Kim et al. | |
| 2017/0048903 A1 | 2/2017 | Yi et al. | |
| 2018/0069618 A1* | 3/2018 | Loehr | H04W 72/1263 |
| 2018/0279358 A1* | 9/2018 | Babaei | H04W 72/0453 |
| 2018/0324641 A1* | 11/2018 | Tsai | H04L 69/321 |
| 2019/0230667 A1* | 7/2019 | Loehr | H04L 1/0078 |
| 2019/0394807 A1* | 12/2019 | Xiao | H04L 5/00 |
| 2020/0245188 A1* | 7/2020 | Zhang | H04W 72/1268 |

* cited by examiner

METHOD AND APPARATUS FOR CONFIGURING MULTIPLE COMMON CONTROL CHANNELS IN WIRELESS COMMUNICATION SYSTEM

CROSS-REFERENCE TO RELATED APPLICATIONS

This application is a National Stage application under 35 U.S.C. § 371 of International Application No. PCT/KR2018/007206, filed on Jun. 26, 2018, which claims the benefit of U.S. Provisional Application Nos. 62/525,210 filed on Jun. 27, 2017, and 62/525,216 filed on Jun. 27, 2017. The disclosures of the prior applications are incorporated by reference in their entirety.

TECHNICAL FIELD

The present invention relates to wireless communications, and more particularly, to a method and apparatus for configuring multiple logical channels, i.e. multiple common control channels (CCCHs), in a wireless communication system, specifically, a new radio access technology (NR) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A random access procedure is triggered by a number of events, for instance, initial access from a radio resource control (RRC) idle state, RRC connection re-establishment procedure, handover, downlink (DL) or uplink (UL) data arrival during an RRC connected state requiring random access procedure, etc.

SUMMARY

In NR, system information (SI) consists of minimum SI and other SI. The other SI may be provided via on-demand basis. The network may not broadcast the other SI periodically, and the UE may request transmission of the other SI. A random access procedure may be used for requesting the other SI. After completion of the random access procedure, the UE can receive the other SI according to the request. However, the random access procedure for SI request may block RRC connection establishment procedure, which is more important than the SI request.

In an aspect, a method for configuring multiple common control channels (CCCHs) by a user equipment (UE) in a wireless communication system is provided. The method includes configuring, by the UE, a first CCCH and a second CCCH, detecting, by the UE, that data is available for the first CCCH and the second CCCH, constructing, by the UE, a media access control (MAC) protocol data unit (PDU) including the data, based on a priority of the first CCCH and a priority of the second CCCH, and transmitting, by the UE, the MAC PDU to a network.

In another aspect, a user equipment (UE) in a wireless communication system is provided. The UE includes a memory, a transceiver, and a processor, operably coupled to the memory and the transceiver, that configures a first common control channel (CCCH) and a second CCCH, detects that data is available for the first CCCH and the second CCCH, constructs a media access control (MAC) protocol data unit (PDU) including the data, based on a priority of the first CCCH and a priority of the second CCCH, and controls the transceiver to transmit the MAC PDU to a network.

Payload for RRC connection establishment can be transmitted with higher priority than payload for SI request, by configuring multiple common control channels (CCCHs) according to priority.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
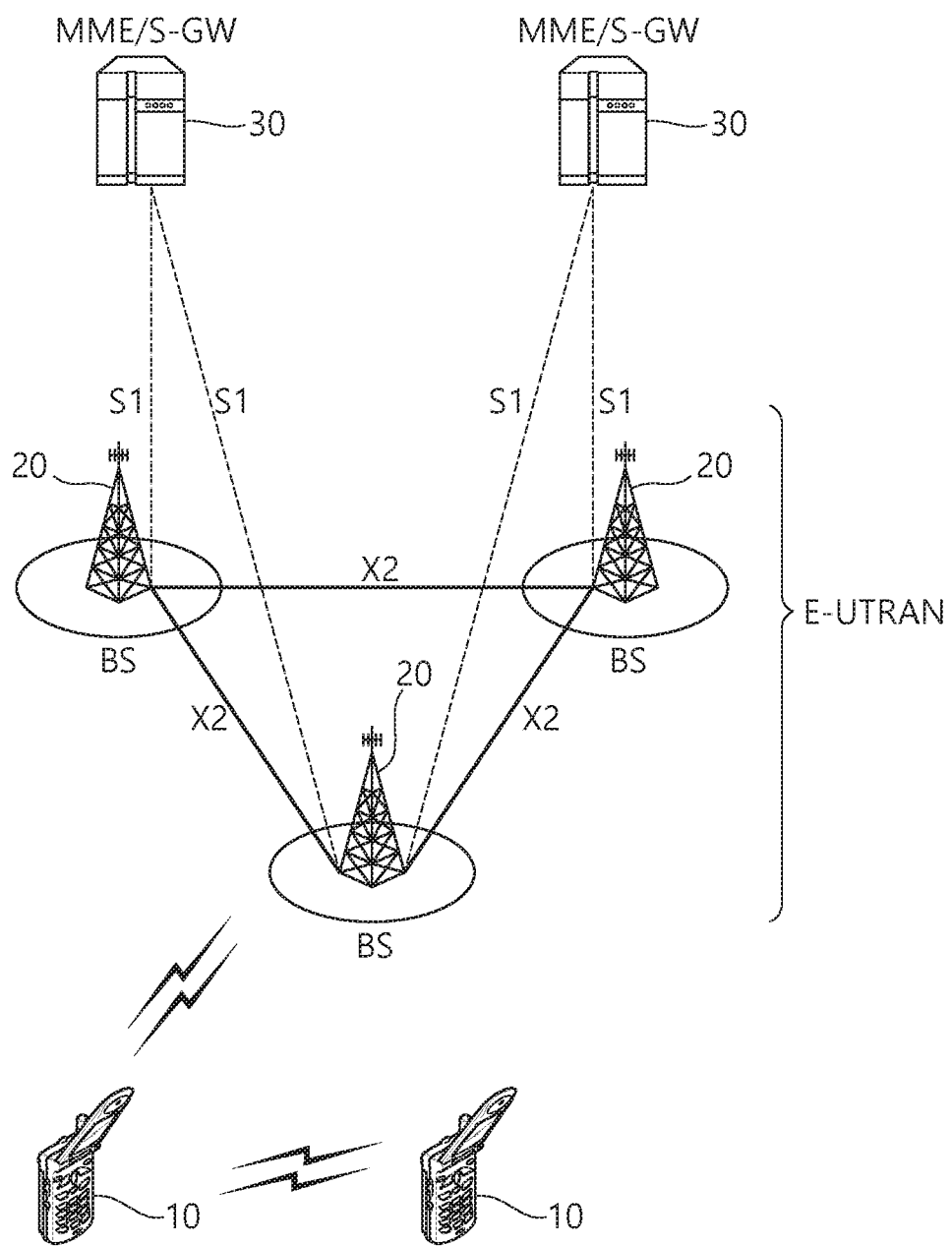
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
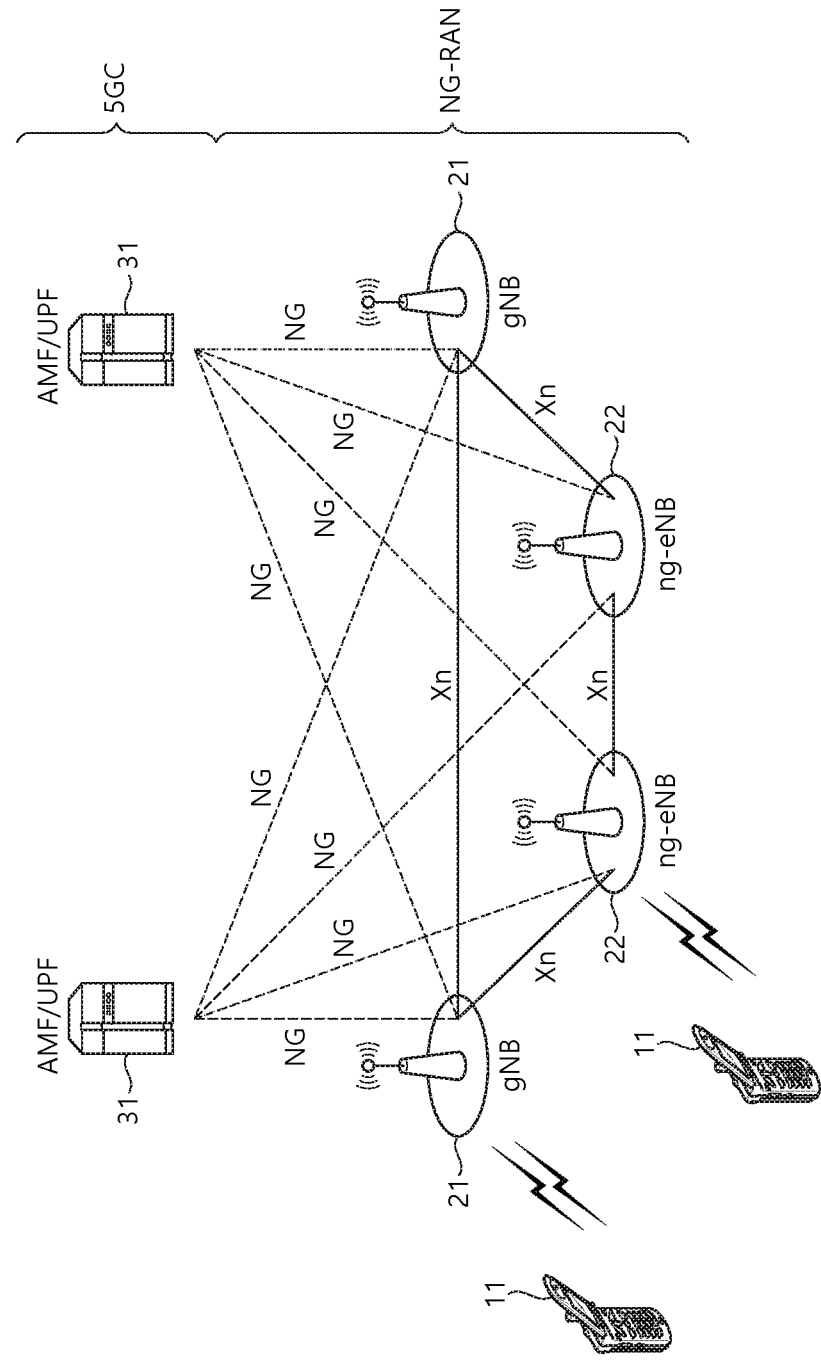
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
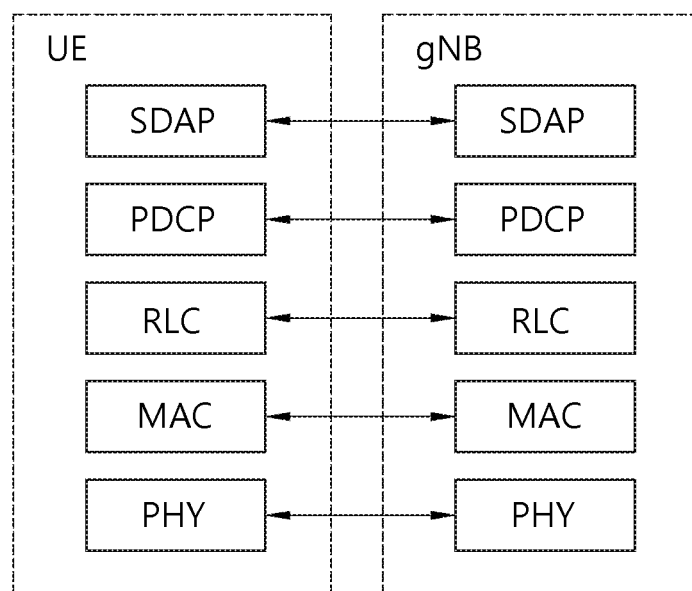
FIG. 3 shows a block diagram of a user plane protocol stack.
Figure 4:
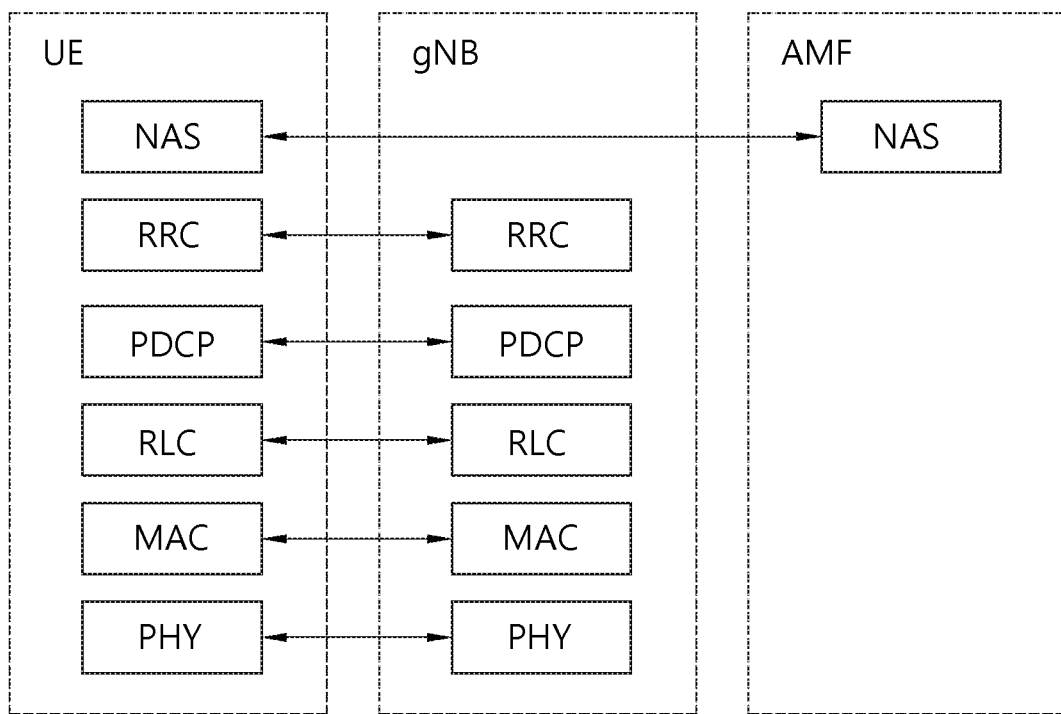
FIG. 4 shows a block diagram of a control plane protocol stack.

FIG. 3 shows a block diagram of a user plane protocol stack. FIG. 4 shows a block diagram of a control plane protocol stack.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), and padding. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM). The main services and functions of the RLC sublayer depend on the transmission mode and include transfer of upper layer PDUs, sequence numbering independent of the one in PDCP (UM and AM), error correction through ARQ (AM only), segmentation (AM and UM) and re-segmentation (AM only) of RLC SDUs, reassembly of SDU (AM and UM), duplicate detection (AM only), RLC SDU discard (AM and UM), RLC re-establishment, and protocol error detection (AM only). The RLC sublayer offers to the packet data convergence protocol (PDCP) sublayer RLC channels;

The PDCP sublayer belong to L2. The main services and functions of the PDCP sublayer for the user plane include sequence numbering, header compression and decompression, transfer of user data, reordering and duplicate detection, PDCP PDU routing, retransmission of PDCP SDUs, ciphering, deciphering and integrity protection, PDCP SDU discard, PDCP re-establishment and data recovery for RLC AM, and duplication of PDCP PDUs. The main services and functions of the PDCP sublayer for the control plane include sequence numbering, ciphering, deciphering and integrity protection, transfer of control plane data, reordering and duplicate detection, and duplication of PDCP PDUs. The PDCP sublayer offers to the service data adaptation protocol (SDAP) sublayer RBs.

The SDAP sublayer belong to L2. The SDAP sublayer is only defined in the user plane. The main services and functions of SDAP include, mapping between a quality of service (QoS) flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging initiated by 5GC or NG-RAN, establishment, maintenance and release of an RRC connection between the UE and NG-RAN, security functions including key management, establishment, configuration, maintenance and release of RBs, mobility functions, QoS management functions, UE measurement reporting and control of the reporting, detection of and recovery from radio link failure, NAS message transfer to/from NAS from/to UE.

In other words, the RRC layer controls logical channels, transport channels, and physical channels in relation to the configuration, reconfiguration, and release of RBs. A RB refers to a logical path provided by L1 (PHY layer) and L2 (MAC/RLC/PDCP/SDAP sublayer) for data transmission between a UE and a network. Setting the RB means defining the characteristics of the radio protocol layer and the channel for providing a specific service, and setting each specific parameter and operation method. RB may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. For example, in RRC_IDLE and RRC_INACTIVE, public land mobile network (PLMN) selection, broadcast of system information (SI) and cell re-selection mobility are supported. However, in RRC_IDLE, paging for mobile terminated (MT) data is initiated by 5GC (i.e. core network (CN) paging), and paging area is managed by 5GC. Further, in RRC_IDLE, discontinuous reception (DRX) for CN paging is configured by NAS. On the other hand, in RRC_INACTIVE, paging is initiated by NG-RAN (i.e. RAN paging), and RAN-based notification area (RNA) is managed by NG-RAN. Further, DRX for RAN paging is configured by NG-RAN.

Meanwhile, in RRC_INACTIVE and RRC_CONNECTED, 5GC-NG-RAN connection (both C/U-planes) is established for UE, and the UE AS context is stored in NG-RAN and the UE. However, in RRC_INACTIVE, NG-RAN merely knows the RNA which the UE belongs to. On the other hand, In RRC_CONNECTED, NG-RAN knows the cell which the UE belongs to. Furthermore, in RRC_CONNECTED, transfer of unicast data to/from the UE, and network controlled mobility, i.e. handover within NR and to/from E-UTRAN, including measurements are supported.

NAS layer is located at the top of the RRC layer. NAS control protocol is terminated in AMF on the network side. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH)

used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications and indications of ongoing public warning system (PWS) broadcasts. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

A random access procedure is described.

Figure 5:
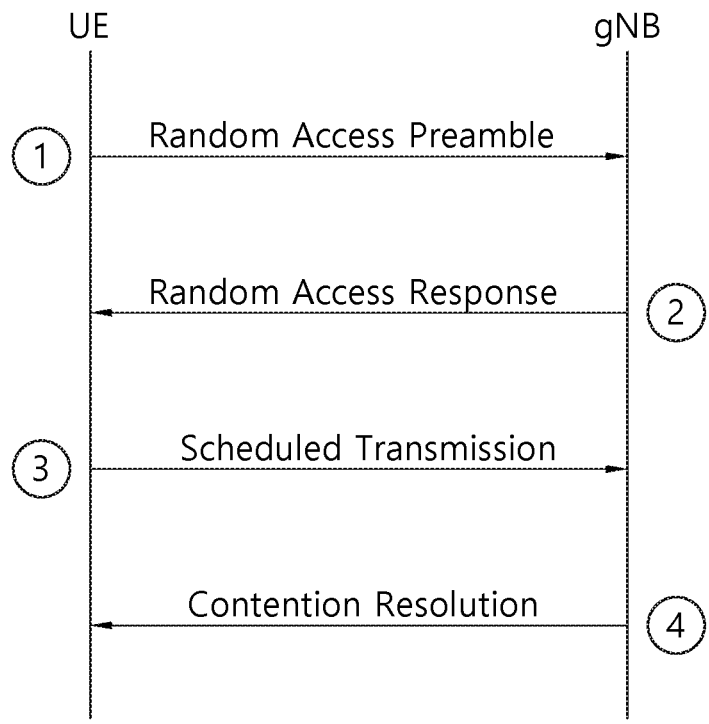
FIG. 5 shows a contention based random access procedure.

FIG. 5 shows a contention based random access procedure.

1. A random access preamble (may be referred to as "MSG1") is transmitted on RACH in UL. A UE randomly selects one random access preamble from a set of random access preambles indicated by system information or a handover command, selects a PRACH resource able to transmit the random access preamble, and transmits the same.

2. After the random access preamble is transmitted, the UE attempts to receive a random access response (may be referred to as "MSG2") hereof generated by MAC on DL-SCH within a random access response reception window indicated by the system information or the handover command. In detail, the random access response information is transmitted in the form of a MAC PDU, and the MAC PDU is transferred on a physical downlink shared channel (PDSCH). In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefor, the UE appropriately receives the random access response transmitted on the PDSCH according to the information items of the PDCCH. The random access response includes a random access preamble identifier (ID), a UL grant (uplink radio resource), a temporary cell radio network temporary identity (C-RNTI), and a time alignment command (TAC). In the above, the reason why the random access preamble identifier is required is because, since a single random access response may include random access response information for one or more UEs, so the random access preamble identifier informs for which UE the UL grant, temporary C-RNTI, and TAC are valid. The random access preamble identifier is identical to a random access preamble selected by the UE in 1.

3. When the UE receives the random access response valid therefor, the UE processes the information items included in the random access response. Namely, the UE applies the TAC and stores the temporary C-RNTI. Also, the UE transmits scheduled data (may be referred to as "MSG3") stored in a buffer thereof or newly generated data to the BS by using the UL grant on UL-SCH. In this case, an identifier of the UE should be included in the data included in the UL grant. The reason is because, in the contention based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g. a SAE-temporary mobile subscriber identity (S-TMSI) or a random ID) in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the BS for a collision resolution (may be referred to as "MSG4"). Namely, in order to receive a particular message, the UE attempts to receive a PDCCH. There are two methods for receiving a PDCCH. As mentioned above, when the identifier of the UE transmitted through the UL grant is a cell identifier, the UE attempts to receive a PDCCH by using its cell identifier, and when the identifier is a unique identifier, the UE attempts to receive a PDCCH by using the temporary C-RNTI included in the random access response. Hereafter, in the former case, when a PDCCH is received through its cell identifier before the contention resolution timer expires, the UE determines that the random access procedure has been normally performed, and terminates the random access procedure. In the latter case, when the UE receives a PDCCH through the temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

Figure 6:
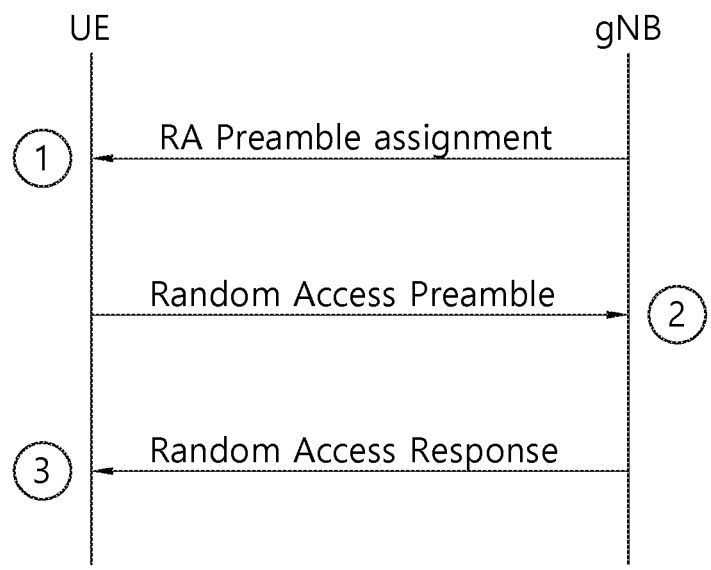
FIG. 6 shows a contention free random access procedure.

FIG. 6 shows a contention free random access procedure.

0. For the non-contention based random access procedure, it is important to receive a designated random access preamble eliminating a possibility of collision. A method of receiving an indication of the random access preamble includes a handover command and a PDCCH command.

1. After receiving the allocated random access preamble designated only for the UE, the UE transmits the preamble to the BS.

2. A method of receiving random access response information is the same as that in the contention-based random access procedure.

System information handling is described. System information is divided into minimum SI and other SI.

Figure 7:
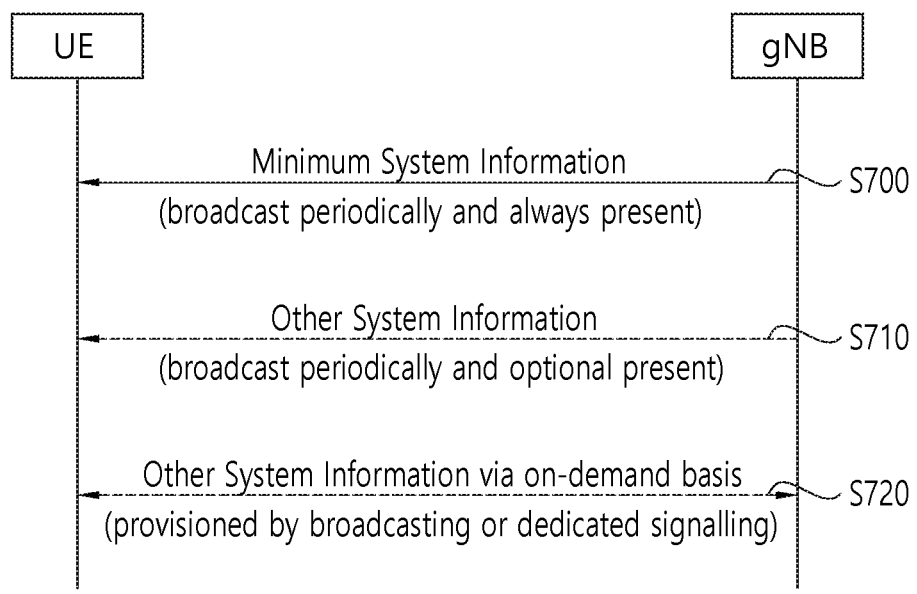
FIG. 7 shows a high level concept of system information provisioning.

FIG. 7 shows a high level concept of system information provisioning.

In step S700, the UE receives the minimum SI from the gNB. The minimum SI is periodically broadcast and always present. The minimum SI comprises basic information required for initial access to a cell and information for acquiring any other SI broadcast periodically or provisioned via on-demand basis, i.e. scheduling information.

The minimum SI is transmitted over two different DL channels using different messages, i.e. MIB and SIB1. The MIB contains cell barred status information and essential physical layer information of the cell required to receive further system information. The SIB1 defines the scheduling of other system information blocks and contains information required for initial access. The term remaining minimum SI (RMSI) is also used to refer to SIB1.

In step S710, the UE may receive the other SI, which is periodically broadcast, from the gNB. The other SI encompasses everything not broadcast in the minimum SI. The other SI is transmitted in SystemInformation messages (SIB2 and above).

In step S720, the UE may receive the other SI from the gNB via on-demand basis. The other SI may either be broadcast, or provisioned in a dedicated manner, either triggered by the network or upon request from the UE. For the other SI required by the UE, before the UE sends the other SI request, the UE needs to know whether it is available in the cell and whether it is broadcast or not. The UE in RRC_IDLE or RRC_INACTIVE should be able to request the other SI without requiring a state transition. For the UE in RRC_CONNECTED, dedicated RRC signaling can be used for the request and delivery of the other SI. The other SI may be broadcast at configurable periodicity and for certain duration. It is network decision whether the other SI is broadcast or delivered through dedicated UE specific RRC signaling.

Each cell on which the UE is allowed to camp broadcasts at least some contents of the minimum SI, while there may be cells in the system on which the UE cannot camp and do not broadcast the minimum SI. For a cell/frequency that is considered for camping by the UE, the UE should not be required to acquire the contents of the minimum SI of that cell/frequency from another cell/frequency layer. This does not preclude the case that the UE applies stored SI from previously visited cell(s). If the UE cannot determine the full contents of the minimum SI of a cell (by receiving from that cell or from valid stored SI from previous cells), the UE shall consider that cell as barred. It is desirable for the UE to learn very quickly that this cell cannot be camped on.

Furthermore, for UEs in RRC_IDLE and RRC_INACTIVE, the network may control whether MSG1 or MSG3 can be used to transmit SI request. Specifically, if the physical random access channel (PRACH) preamble and/or PRACH resource specific to each SIB or set of SIBs which the UE needs to acquire is included in minimum SI, then SI request is indicated using MSG1. On the other hand, if the PRACH preamble and/or PRACH resource specific to each SIB or set of SIBs which the UE needs to acquire is not included in minimum SI, then SI request is included in MSG3.

Central unFIG. 8 shows an example of gNB architecture.it (CU)-distributed unit (DU) split is described.

Figure 8:
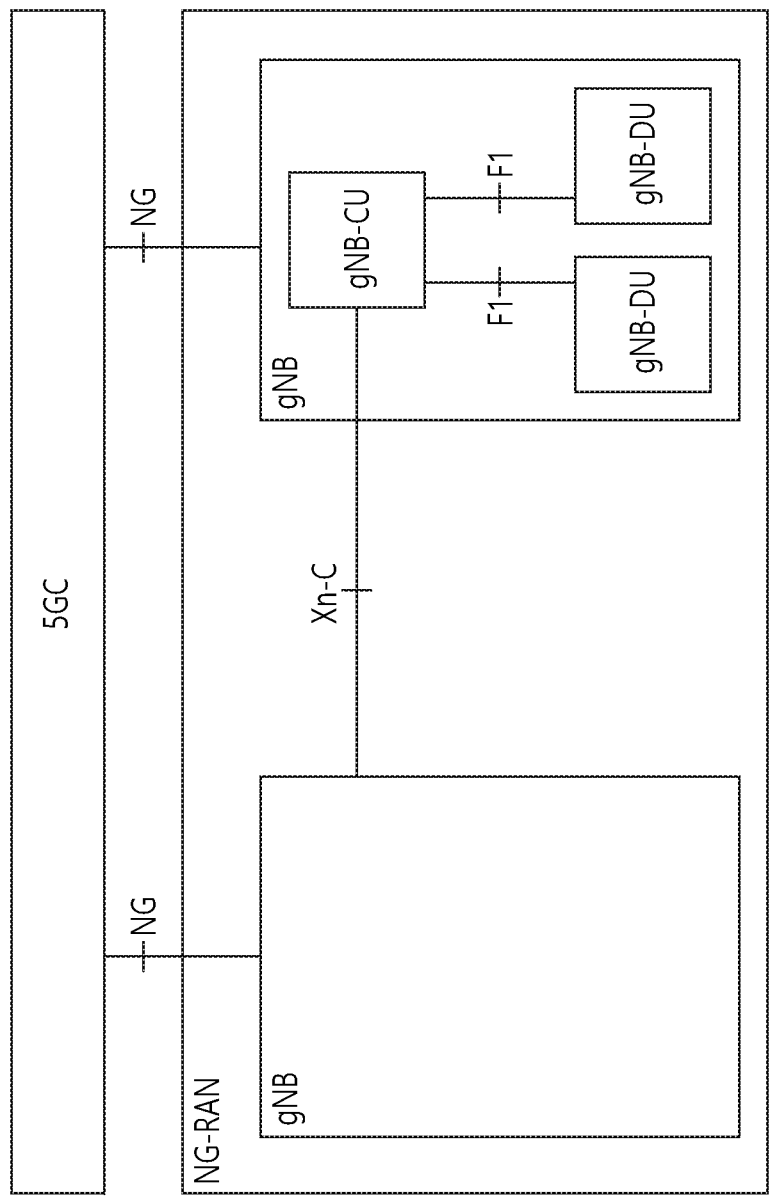
FIG. 8 shows an example of gNB architecture.

Referring to FIG. 8, a gNB may consist of a gNB-CU and one or more gNB-DUs. A gNB-CU is a logical node hosting RRC, SDAP and PDCP protocols of the gNB or RRC and PDCP protocols of the en-gNB. The gNB-CU controls the operation of one or more gNB-DUs. A gNB-DU is a logical node hosting RLC, MAC and PHY layers of the gNB or en-gNB. Operation of the gNB-DU is partly controlled by gNB-CU. One gNB-DU supports one or multiple cells. One cell is supported by only one gNB-DU.

A gNB-CU and a gNB-DU is connected via F1 interface. The gNB-CU terminates the F1 interface connected with the gNB-DU. The gNB-DU terminates the F1 interface connected with the gNB-CU. One gNB-DU is connected to only one gNB-CU. For resiliency, a gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

MAC PDU is described. A MAC PDU is a bit string that is byte aligned (i.e. multiple of 8 bits) in length. A MAC SDU is a bit string that is byte aligned (i.e. multiple of 8 bits) in length. A MAC SDU is included into a MAC PDU from the first bit onward. A MAC control element (CE) is a bit string that is byte aligned (i.e. multiple of 8 bits) in length. A MAC subheader is a bit string that is byte aligned (i.e. multiple of 8 bits) in length. Each MAC subheader is placed immediately in front of the corresponding MAC SDU, MAC CE, or padding.

A MAC PDU may consist of one or more MAC subPDUs. Each MAC subPDU consists of one of the following:

A MAC subheader only (including padding);
A MAC subheader and a MAC SDU;
A MAC subheader and a MAC CE;
A MAC subheader and padding.

The MAC SDUs are of variable sizes.

Each MAC subheader corresponds to either a MAC SDU, a MAC CE, or padding.

A MAC subheader except for fixed sized MAC CE, padding, and a MAC SDU of CCCH of size 48 bits consists of the four header fields R/F/LCID/L. A MAC subheader for fixed sized MAC CE, padding, and a MAC SDU of CCCH of size 48 bits consists of the two header fields R/LCID.

Figure 9:
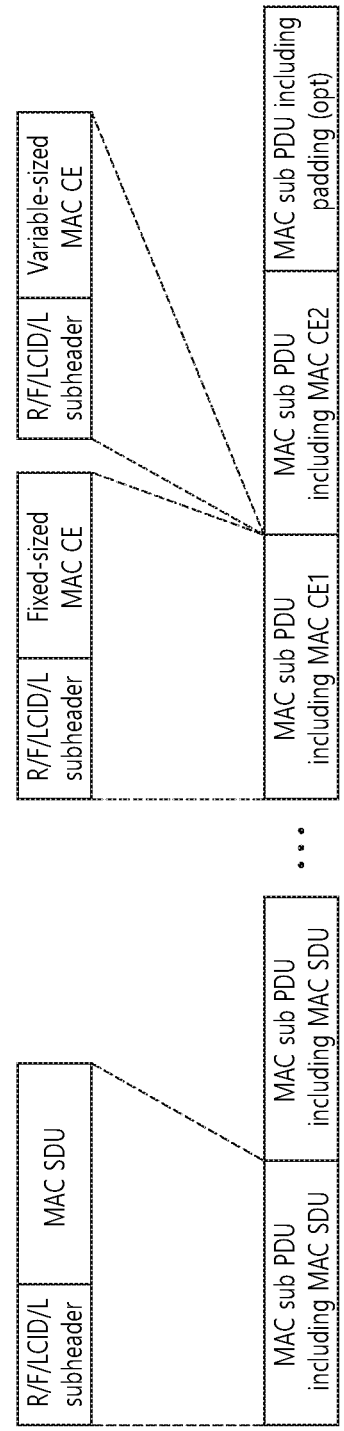
FIG. 9 shows an example of a UL MAC PDU.

FIG. 9 shows an example of a UL MAC PDU. Referring to FIG. 9, UL MAC subPDU(s) with MAC CE(s) is placed after all the MAC subPDU(s) with MAC SDU and before the MAC subPDU with padding in the MAC PDU. The size of padding can be zero. MAC CEs are placed together.

A logical channel prioritization (LCP) is described. The LCP procedure is applied when a new transmission is performed.

The RRC layer controls the scheduling of UL data by signalling for each logical channel: priority where an increasing priority value indicates a lower priority level, prioritisedBitRate which sets the prioritized bit rate (PBR), bucketSizeDuration which sets the bucket size duration (BSD).

The MAC entity shall maintain a variable Bj for each logical channel j. Bj shall be initialized to zero when the related logical channel is established, and incremented by the product PBR X TTI duration for each TTI, where PBR is prioritized bit rate of logical channel j. However, the value of Bj can never exceed the bucket size and if the value of Bj is larger than the bucket size of logical channel j, it shall be set to the bucket size. The bucket size of a logical channel is equal to PBR X BSD, where PBR and BSD are configured by upper layers.

The MAC entity shall perform the following LCP procedure when a new transmission is performed:

The MAC entity shall allocate resources to the logical channels in the following steps:

1> Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

2> Step 2: the MAC entity shall decrement Bj by the total size of MAC SDUs served to logical channel j in Step 1.

3> Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

1> The UE should not segment an RLC SDU (or partially transmitted SDU or retransmitted RLC PDU) if the whole SDU (or partially transmitted SDU or retransmitted RLC PDU) fits into the remaining resources of the associated MAC entity;

2> if the UE segments an RLC SDU from the logical channel, it shall maximize the size of the segment to fill the grant of the associated MAC entity as much as possible;

3> the UE should maximise the transmission of data.

4> if the MAC entity is given an UL grant size that is equal to or larger than 4 bytes while having data available for transmission, the MAC entity shall not transmit only padding buffer status report (BSR) and/or padding (unless the UL grant size is less than 7 bytes and an AMD PDU segment needs to be transmitted).

The MAC entity shall not transmit data for a logical channel corresponding to a radio bearer that is suspended.

For the LCP procedure, the MAC entity shall take into account the following relative priority in decreasing order:

MAC CE for cell radio network temporary identity (C-RNTI) or data from UL-CCCH;

MAC CE for BSR, with exception of BSR included for padding;

MAC CE for power headroom report (PHR), extended PHR, or dual connectivity PHR;

MAC CE for sidelink BSR, with exception of sidelink BSR included for padding;

data from any logical channel, except data from UL-CCCH;

MAC CE for BSR included for padding;

MAC CE for sidelink BSR included for padding.

A problem of the prior art is described.

As described above, a CCCH is a logical channel for transmitting control information between UEs and network. This channel is used for UEs having no RRC connection with the network. In LTE, the CCCH carries RRC messages for state transition of the UE. That is, MSG3 of the random access procedure is transmitted via CCCH for state transition of the UE. For initial access, the RRC connection request message is transmitted via CCCH. For RRC connection re-establishment procedure, the RRC connection re-establishment request message is transmitted via CCCH. In the procedure to resume the RRC connection, the RRC connection resume request message is transmitted via CCCH. SRB0 is for RRC messages using the CCCH.

Meanwhile, in NR, the CCCH is used for other purposes than state transition of the UE. For example, MSG3 of the random access procedure may be used for requesting the other SI. As describe above, if the PRACH preamble and/or PRACH resource specific to each SIB or set of SIBs which the UE needs to acquire is not included in minimum SI, then SI request is included in MSG3. The MSG3 for requesting the other SI is not for state transition of the UE, but may be transmitted via CCCH. For another example, early data transmission (EDT) may be performed via CCCH. EDT is not for state transition, but may be transmitted via CCCH. The MSG3 for requesting the other SI or EDT is less important than the MSG3 for initial access, RRC connection re-establishment, or RRC connection resume.

However, the UE may continue to perform the random access procedure for SI request at the same cell, until the requested SI is received. Thus, there may be a case that the UE continuously perform the random access procedure, e.g. at the edge of the cell, while the requested SI has been not received. If the UE triggers RRC connection establishment, but if UE still performs the random access procedure for SI request, the RRC connection request message cannot be transmitted until SI request message is transmitted. Thus, the random access procedure for SI request will delay RRC connection establishment procedure.

Furthermore, even though EDT is configured, there may be a case that early data cannot be transmitted via CCCH due to a small size of a UL grant. In this case, stuck problem may occur, and even the MSG3 for initial access, RRC connection re-establishment, or RRC connection resume cannot be transmitted.

Hereinafter, In order to solve the problem described above, embodiments of the present invention are described.

1. Embodiment 1

Embodiment 1 of the present invention proposes configuring multiple CCCHs.

(1) Embodiment 1-1

Figure 10:
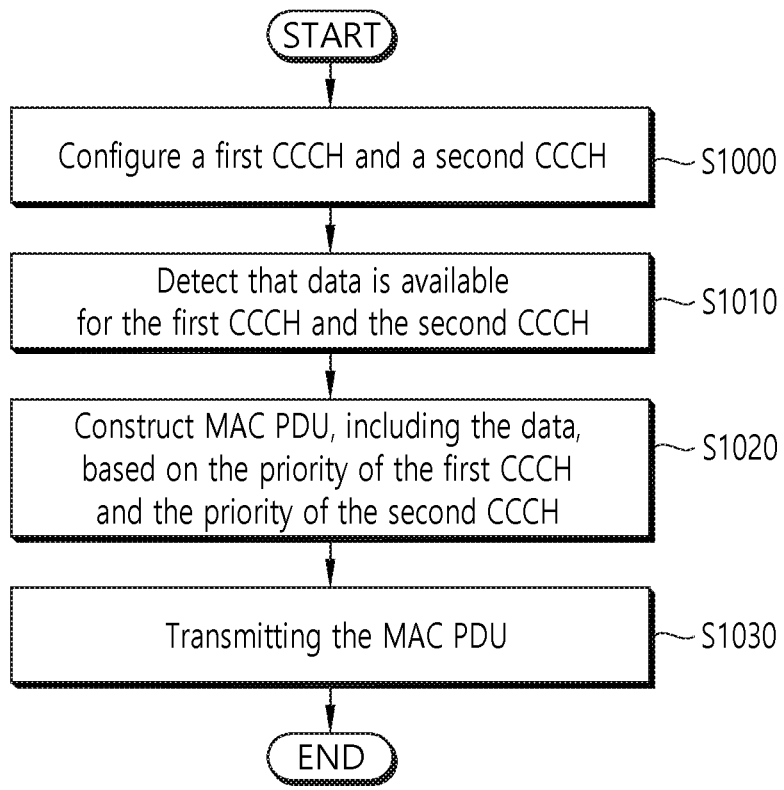
FIG. 10 shows a method for configuring multiple CCCHs according to an embodiment 1-1 of the present invention.

FIG. 10 shows a method for configuring multiple CCCHs according to an embodiment 1-1 of the present invention. In this embodiment, the UE may perform on-demand SI delivery.

In step S1000, the UE configures a first CCCH and a second CCCH. That is, the UE configures two different CCCHs for UL. The first CCCH may have a higher priority than the second CCCH in LCP. The first CCCH may be for SRB0, while the second CCCH may be for SRB0bis. The first CCCH may be applicable for UL and DL, while the second CCCH may be applicable only for UL. The first CCCH may have a higher priority than all MAC CEs. The second CCCH may have a lower priority than a certain MAC CE(s) (e.g. BSR MAC CE, PHR MAC CE) and may have a higher priority than the other MAC CE(s).

When the gNB consists of one gNB-CU and one or more gNB-DUs, the gNB may terminate the first CCCH in the gNB-CU by configuring the RRC entity of the first CCCH. Further, the gNB may terminate the second CCCH in the gNB-DU by configuring the RRC entity of the first CCCH.

The UE may trigger a random access procedure to send a message on a CCCH. In the random access procedure, the UE transmits a random access preamble and then receives UL grant as a response to the random access preamble.

In step S1010, the UE detects that data is available for the first CCCH and the second CCCH. In step S1020, the UE construct a MAC PDU, including the data, based on the priority of the first CCCH and the priority of the second CCCH. That is, if there are messages available for both the first CCCH and the second CCCH in UL, the UE may occupy the granted resources with the message on the first CCCH and then occupy the remaining part of the granted resources, if available, with the message on the second CCCH. More specifically, the UE constructs the MAC PDU based on the UL grant. The UE may occupy the payload of the MAC PDU with a RLC PDU from the first CCCH and the header of the MAC PDU with a logical channel ID (LCID) of the first CCCH. Then, if there is a remaining part of the payload of the MAC PDU, the UE may occupy the remaining part of the payload of the MAC PDU with a RLC PDU from the second CCCH and a LCID of the second CCCH. The LCIDs of the first CCCH and the second CCCH may have different values. The LCID may be included in the (sub-)header of the MAC PDU.

In step S1030, the UE transmits the MAC PDU with the grant resources.

When the gNB consists of one gNB-CU and one or more gNB-DUs, and if the gNB-DU receives the MAC PDU, the gNB-DU may decode the MAC PDU and may determine whether some of the MAC PDU is forwarded to the gNB-CU by using the (sub-)header of the MAC PDU, e.g. LCIDs in the (sub-)header. If the LCID included in the (sub-) header of the MAC PDU indicates the first CCCH, the PDU or SDU corresponding to the first CCCH may be forwarded to the gNB-CU (up to the RRC entity of the gNB-CU). If the LCID included in the (sub-)header of the MAC PDU indicates the second CCCH, the PDU or SDU corresponding to the second CCCH may be forwarded up to the RRC entity of the gNB-DU.

Furthermore, if all data from a particular logical channel cannot be accommodated by the UL grant, the UE may trigger a MAC CE indicating data of the logical channel. The MAC CE may be a BSR MAC CE. The logical channel may be a type of the CCCH, i.e. the first/second CCCH.

(2) Embodiment 1-2

Figure 11:
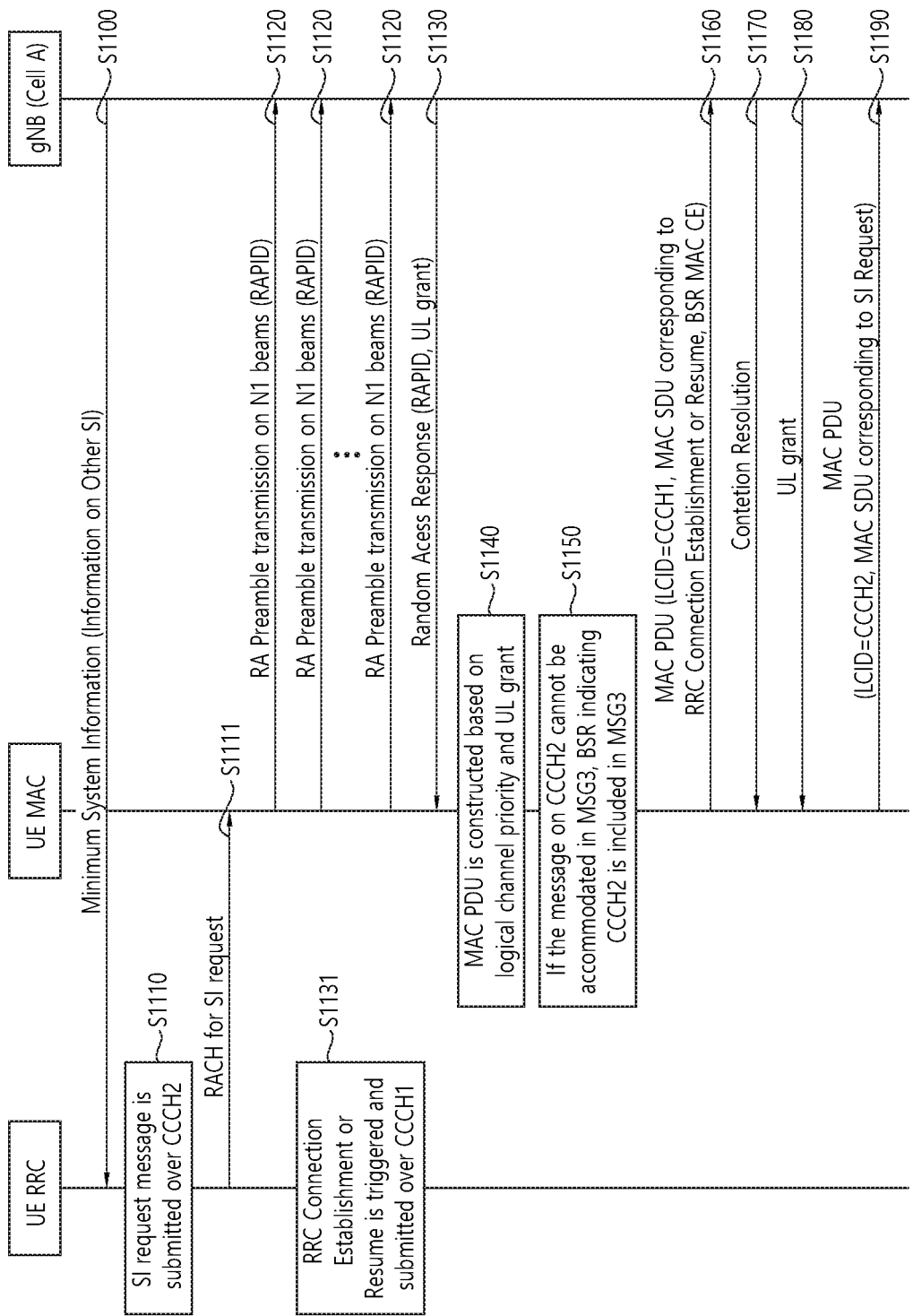
FIG. 11 shows a method for performing SI request according to an embodiment 1-2 of the present invention.

FIG. 11 shows a method for performing SI request according to an embodiment 1-2 of the present invention.

In step S1100, the UE camps on a cell, e.g. Cell A. The RRC layer of the UE (hereinafter, referred to as simply "UE RRC") receives the minimum SI from the cell. The minimum SI may broadcast whether the UE should request the other SI to the cell or not.

If the UE has not yet received the other SI from the cell and if the minimum SI informs that the UE should request other SI to the cell, the UE RRC initiates SI request procedure for one or more SI messages or one or more SI blocks (SIBs). Accordingly, in step S1110, the UE RRC submits a SI request message to lower layers over the second CCCH (e.g. an RLC entity of the second CCCH). In step S1111, the UE RRC triggers a random access procedure to request the other SI.

If the random access procedure is triggered for SI request or if data is available for a particular logical channel, e.g. the second CCCH, in step S1120, the MAC sublayer of the UE (hereinafter, referred to as simply "UE MAC") selects one of random access preamble identifiers (RAPIDs) mapped to SI request and transmits a random access preamble with the selected RAPID to the gNB. The random access preamble may be transmitted on at least one beam.

Alternatively, the UE RRC may select one of RAPIDs which is mapped to SI request, a requested SI message or a requested SIB. Then, the UE RRC may indicate the selected RAPID to the UE MAC.

In step S1130, the UE MAC receives the random access response (RAR) message indicating the transmitted RAPID and a UL grant from the gNB. If the UE MAC does not receive RAR message indicating the transmitted RAPID, the UE MAC may re-transmit a random access preamble with power ramping.

Meanwhile, in step S1131, RRC connection establishment or resume is triggered. Accordingly, the UE RRC submits a RRC connection request message to lower layers over the first CCCH.

In step S1140, the UE MAC performs LCP procedure and constructs MAC PDU based on logical channel priorities and the UL grant. In the LCP procedure, the first CCCH may have a higher priority than data from DCCH, all MAC CEs and data from the second CCCH. The first CCCH may have a higher priority than all MAC CEs. The second CCCH may have a lower priority than a certain MAC CE(s) (e.g. BSR MAC CE, PHR MAC CE) and may have a higher priority than the other MAC CE(s).

In step S1150, if data is available for the first CCCH, the UE occupies the payload of the MAC PDU with a RLC PDU from the first CCCH and the header of the MAC PDU with a LCID of the first CCCH. Then, if there is a remaining part of the payload of the MAC PDU and if the SI request message cannot be included in the payload of the MAC PDU, the UE occupies the remaining part of the payload of the MAC PDU with a MAC CE indicating the second CCCH (e.g. BSR MAC CE indicating buffer status of the second CCCH) and a LCID of the MAC CE. The LCIDs of the first CCCH and the second CCCH may have different values. On the other hand, if there is a remaining part of the payload of the MAC PDU and if the SI request message can be included in the payload of the MAC PDU, the UE occupies the remaining part of the payload of the MAC PDU with a RLC PDU from the second CCCH and a LCID of the second CCCH. In this embodiment, it is assumed that the SI request message cannot be included in the payload of the MAC PDU, so BSR MAC CE indicating the second CCCH is included in the MAC PDU.

In step S1160, the UE MAC transmits the MAC PDU (i.e. MSG3) to the gNB by using the UL grant. In this embodiment, the MAC PDU includes a header with a LCID of the first CCCH, MAC SDUs corresponding to RRC connection establishment or resume, and a BSR MAC CE indicating the second CCCH.

If the UE MAC does not receive positive HARQ-ACK as a response to the MSG3 or if the UE MAC receives UL grant for re-transmission of the MSG3, the UE MAC may re-transmit SI request to the gNB. If the UE MAC does not receive positive HARQ-ACK as a response to the MSG3 until the maximum re-transmission of MSG3 has been reached, the UE MAC may re-transmit a random access preamble to the gNB.

In step S1170, the UE MAC receives a contention resolution message to the MSG3 from the gNB. The contention resolution message may be received via PDCCH or contention resolution MAC CE. The UE MAC may consider the random access procedure successful. Otherwise, the UE MAC may re-transmit a random access preamble.

If the UE transmits the MAC CE indicating the second CCCH in step S1160, the UE receives another UL grant in step S1180. The UE may construct another MAC PDU based on logical channel priorities and this UL grant. If the SI request message was not included in the payload of the MAC PDU previously, data from the second CCCH may be included in this MAC PDU. In step S1190, the UE transmits the MAC PDU to the gNB. This MAC PDU includes a header with a LCID of the second CCCH and MAC SDUs corresponding to SI request.

2. Embodiment 2

Embodiment 2 of the present invention proposes configuring RACH contention resolution identity MAC CE.

Figure 12:
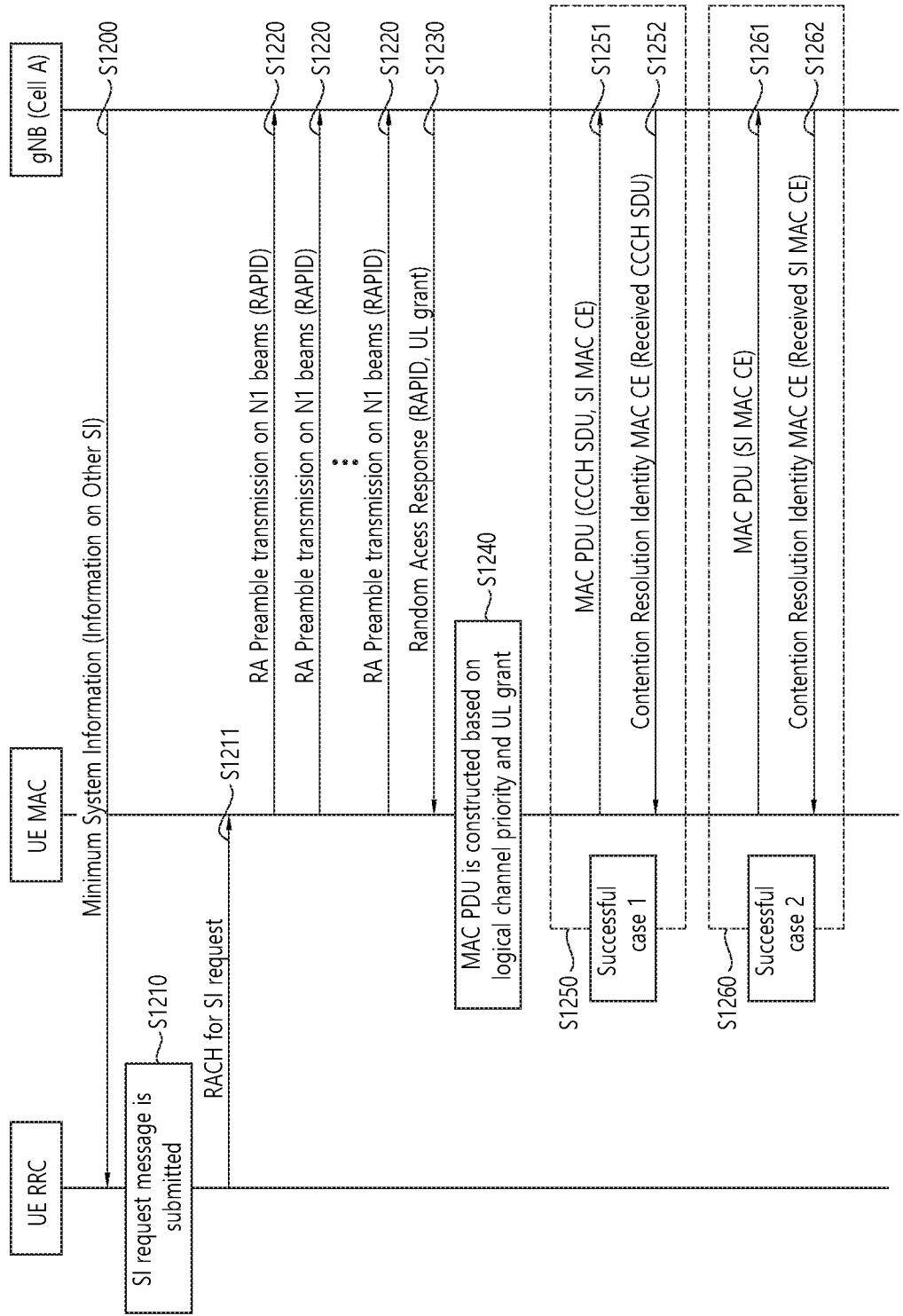
FIG. 12 shows a method for performing SI request according to an embodiment 2 of the present invention.

FIG. 12 shows a method for performing SI request according to an embodiment 2 of the present invention.

In step S1200, the UE camps on a cell, e.g. Cell A. The UE RRC receives the minimum SI from the cell. The minimum SI may broadcast whether the UE should request the other SI to the cell or not.

If the UE has not yet received the other SI from the cell and if the minimum SI informs that the UE should request other SI to the cell, the UE RRC initiates SI request procedure for one or more SI messages or one or more SIBs. Accordingly, in step S1210, the UE RRC submits a SI request message to lower layers over the CCCH. In step S1211, the UE RRC triggers a random access procedure to request the other SI.

If the random access procedure is triggered for SI request, in step S1220, the UE MAC selects one of RAPIDs mapped to SI request and transmits a random access preamble with the selected RAPID to the gNB. The random access preamble may be transmitted on at least one beam.

Alternatively, the UE RRC may select one of RAPIDs which is mapped to SI request, a requested SI message or a requested SIB. Then, the UE RRC may indicate the selected RAPID to the UE MAC.

In step S1230, the UE MAC receives the RAR message indicating the transmitted RAPID and a UL grant from the gNB. If the UE MAC does not receive RAR message indicating the transmitted RAPID, the UE MAC may re-transmit a random access preamble with power ramping.

In this embodiment, it is assumed that the random access procedure is triggered for SI request. But, the present invention is not limited to thereto. The present invention may cover various cases using the random access procedure. That is, the UE may trigger the random access procedure while the UE is in RRC_IDLE or in RRC_INACTIVE, or when the UE requests SI, or when the UE performs RRC connection re-establishment.

In step S1240, the UE MAC performs LCP procedure and constructs MAC PDU based on logical channel priorities and the UL grant. The UE transmits a MSG3 to the gNB based on the UL grant. The MSG3 may include at least one of a CCCH SDU or a MAC CE, e.g. SI MAC CE or BSR MAC CE, as a payload of the MAC PDU. If UE RRC triggers this random access procedure for SI request, the UE MAC may create SI MAC CE and constructs MAC PDU including the SI MAC CE. The SI MAC CE may indicate one or more requested SI messages or one or more requested SIB types as a bitmap. Each bit includes a single SI message or a single SIB type. If CCCH SDU is created due to RRC connection establishment (from UE in RRC_IDLE), RRC connection re-establishment (from UE in RRC_CONNECTED) or RRC connection resume (from UE in RRC_INACTIVE), the UE MAC may construct MAC PDU including the CCCH SDU. If both the CCCH SDU and the MAC CE are created during this random access procedure, the UE MAC may multiplex the CCCH SDU and the MAC CE into one MAC PDU.

Upon receiving the MSG3 form the UE, the gNB transmits a contention resolution identity MAC CE to the UE as follows.

If only the CCCH SDU is included in the MSG3 without the MAC CE, the gNB may include the received CCCH SDU in the contention resolution identity MAC CE.

If both the CCCH SDU and the MAC CE is included in the MSG3, the gNB may include the received CCCH SDU in the contention resolution identity MAC CE without the received MAC CE.

If only the MAC CE is included in the MSG3 without the CCCH SDU, the gNB includes the received MAC CE in the contention resolution identity MAC CE.

Figure 13:
FIG. 13 shows an example of a contention resolution identity MAC CE according to an embodiment of the present invention.

FIG. 13 shows an example of a contention resolution identity MAC CE according to an embodiment of the present invention. Referring to FIG. 13, the contention resolution identity MAC CE contains the UL CCCH SDU if the UL CCCH SDU is received from the UE and the UL CCCH SDU is 48 bits long. Alternatively, the contention resolution identity MAC CE contains the UL MAC CE if the UL CCCH SDU is not received from the UE. Alternatively, if the UL CCCH SDU is received from the UE and the UL CCCH SDU is longer than 48 bits, the contention resolution identity MAC CE contains the first 48 bits of the UL CCCH SDU. If the UL CCCH SDU is contained in the contention resolution identity MAC CE, the length of the contention resolution identity MAC CE is equal to the UL MAC CE (i.e. longer than 48 bits, shorter than 48 bits or equal to 48 bits.

In summary, if the MSG3 includes the CCCH SDU, the gNB constructs the contention resolution identity MAC CE by including only the received CCCH SDU and transmits the same. If the MSG3 include only the MAC CE without the CCCH SDU, the gNB constructs the contention resolution identity MAC CE by including the received MAC CE and transmits the same.

If the UE MAC does not receive positive HARQ-ACK as a response to the MSG3 or if the UE MAC receives UL grant for re-transmission of the MSG3, the UE MAC may re-transmit SI request to the gNB. If the UE MAC does not receive positive HARQ-ACK as a response to the MSG3 until the maximum re-transmission of MSG3 has been reached, the UE MAC may re-transmit a random access preamble to the gNB.

The UE MAC receives the contention resolution identity MAC CE from the gNB. When the UE is in one of an SI request procedure, RRC connection establishment procedure, RRC connection resume procedure or RRC connection re-establishment procedure, and if one of the following conditions is met, the UE may consider the random access procedure as successful.

if the MSG3 includes a CCCH SDU (with or without a MAC CE) and the received contention resolution identity MAC Control CE includes the CCCH SDU; or if the MSG3 includes a MAC CE without CCCH SDU and the received contention resolution identity MAC CE includes the MAC CE.

Otherwise, the UE MAC may re-transmit a random access preamble.

By referring to FIG. 12 again, in step S1250, a successful case 1 is described. In step S1251, the UE MAC transmits the MAC PDU including the CCCCH SDU and SI MAC CE to the gNB. In step S1252, the gNB transmits the contention resolution identity MAC CE including the received CCCH SDU to the UE. Furthermore, in step S1260, a successful case 2 is described. In step S1261, the UE MAC transmits the MAC PDU including only the SI MAC CE to the gNB. In step S1252, the gNB transmits the contention resolution identity MAC CE including the received SI MAC CE.

Figure 14:
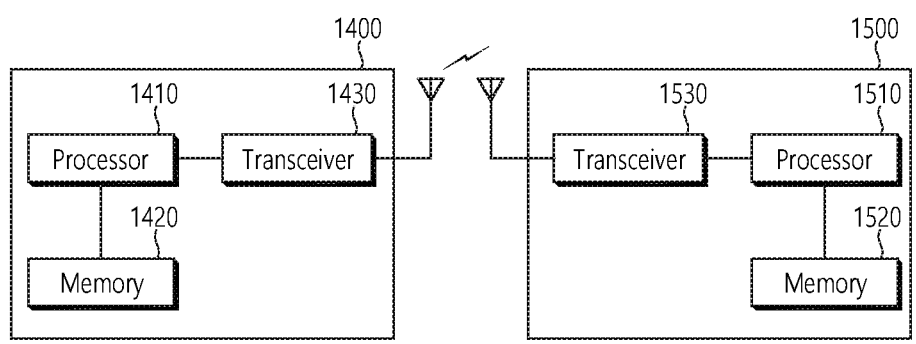
FIG. 14 shows a wireless communication system to implement an embodiment of the present invention.

FIG. 14 shows a wireless communication system to implement an embodiment of the present invention.

A UE 1400 includes a processor 1410, a memory 1420 and a transceiver 1430. The processor 1410 may be configured to implement proposed functions, procedures and/or methods described in this description. Layers of the radio interface protocol may be implemented in the processor 1410. The memory 1420 is operatively coupled with the processor 1410 and stores a variety of information to operate the processor 1410. The transceiver 1430 is operatively coupled with the processor 1410, and transmits and/or receives a radio signal to a network node 1500.

A network node 1500 includes a processor 1510, a memory 1520 and a transceiver 1530. The processor 1510 may be configured to implement proposed functions, procedures and/or methods described in this description. Layers of the radio interface protocol may be implemented in the processor 1510. The memory 1520 is operatively coupled with the processor 1510 and stores a variety of information to operate the processor 1510. The transceiver 1530 is operatively coupled with the processor 1510, and transmits and/or receives a radio signal.

The processors 1410, 1510 may include application-specific integrated circuit (ASIC), other chipset, logic circuit and/or data processing device. The memories 1420, 1520 may include read-only memory (ROM), random access memory (RAM), flash memory, memory card, storage medium and/or other storage device. The transceivers 1430, 1530 may include baseband circuitry to process radio frequency signals. When the embodiments are implemented in software, the techniques described herein can be implemented with modules (e.g., procedures, functions, and so on) that perform the functions described herein. The modules can be stored in memories 1420, 1520 and executed by processors 1410, 1510. The memories 1420, 1520 can be implemented within the processors 1410, 1510 or external to the processors 1410, 1510 in which case those can be communicatively coupled to the processors 1410, 1510 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
configuring, by the wireless device, a first common control channel (CCCH) and a second CCCH;
detecting, by the wireless device, that data for the first CCCH and data for the second CCCH are available;
constructing, by the wireless device, a media access control (MAC) protocol data unit (PDU) including at least one of the data for the first CCCH or the data for the second CCCH, based on a priority of the first CCCH and a priority of the second CCCH; and
transmitting, by the wireless device, the MAC PDU to a network,
wherein the MAC PDU is constructed such that:
 (i) a radio link control (RLC) PDU from the first CCCH is included in a payload of the MAC PDU, and a logical channel identifier (LCID) of the first CCCH is included in a header of the MAC PDU; and
 (ii) based on that a remaining part of the payload of the MAC PDU is available and that the data for the first CCCH can be included in the payload of the MAC PDU, a RLC PDU from the second CCCH and a LCID of the second CCCH are included in the remaining part of the payload of the MAC PDU.

2. The method of claim 1, wherein the priority of the first CCCH is higher than the priority of the second CCCH in a logical channel prioritization (LCP) procedure.

3. The method of claim 1, wherein the priority of the second CCCH is lower than a priority of a first set of MAC control elements (CEs) in a LCP procedure, and
wherein the priority of the second CCCH is higher than a priority of a second set of MAC CEs in the LCP procedure.

4. The method of claim 3, wherein the first set of MAC CEs includes at least one of a buffer status reporting (BSR) MAC CE or a power headroom reporting (PHR) MAC CE.

5. The method of claim 1, wherein the second CCCH is configured only for uplink (UL).

6. The method of claim 1, wherein the LCID of the first CCCH and the LCID of the second CCCH have different values.

7. The method of claim 1, wherein the configuring of the first CCCH and the second CCCH is performed by a radio resource control (RRC) layer of the wireless device, and
wherein the constructing of the MAC PDU and the transmitting of the MAC PDU are performed by a MAC sublayer of the wireless device.

8. The method of claim 7, further comprising:
submitting, by the RRC layer of the wireless device, a system information (SI) request message to a lower layer of the wireless device over the second CCCH.

9. The method of claim 8, further comprising transmitting, by the MAC sublayer of the wireless device, a random access preamble with a random access preamble identifier (RAPID) which is mapped to SI request.

10. The method of claim 1, wherein the MAC PDU is included in MSG3 of a random access procedure.

11. The method of claim 1, wherein the MAC PDU is transmitted to the network via a gNB in a new radio access technology (NR).

12. The method of claim 1, wherein the wireless device is configured to be in communication with at least one of a mobile device, a network, or autonomous vehicles other than the wireless device.

13. A wireless device configured to operate in a wireless communication system, the wireless device comprising:
a memory;
a transceiver; and
at least one processor, operably coupled to the memory and the transceiver, configured to:
configure a first common control channel (CCCH) and a second CCCH;
detect that data for the first CCCH and data for the second CCCH are available;
construct a media access control (MAC) protocol data unit (PDU) including at least one of the data for the first CCCH or the data for the second CCCH, based on a priority of the first CCCH and a priority of the second CCCH; and control the transceiver to transmit the MAC PDU to a network, wherein the MAC PDU is constructed such that:

(i) a radio link control (RLC) PDU from the first CCCH is included in a payload of the MAC PDU, and a logical channel identifier (LCID) of the first CCCH is included in a header of the MAC PDU; and (ii) based on that a remaining part of the payload of the MAC PDU is available and that the data for the first CCCH can be included in the payload of the MAC PDU, a RLC PDU from the second CCCH and a LCID of the second CCCH are included in the remaining part of the payload of the MAC PDU.

* * * * *